United States Patent [19]

Hardiman

[11] Patent Number: 5,266,665
[45] Date of Patent: Nov. 30, 1993

[54] METATHESIS POLYMERIZATION CATALYST AND METHOD OF POLYMERIZING CYCLIC OLEFINS THEREWITH

[75] Inventor: Christopher J. Hardiman, Belchertown, Mass.

[73] Assignee: Monsanto Company, St. Louis, Mo.

[21] Appl. No.: 531,663

[22] Filed: Jun. 1, 1990

[51] Int. Cl.$^5$ ............... C08F 4/26; C08F 32/04; B32B 33/00
[52] U.S. Cl. ................ 526/117; 526/77; 526/88; 526/91; 526/93; 526/113; 526/120; 526/154; 526/281; 526/283; 526/308; 526/902; 502/111; 502/117; 502/225; 502/226; 502/227; 502/228; 502/230; 428/403
[58] Field of Search ............ 526/93, 117, 120, 154, 526/281, 308, 108, 113, 91, 283, 88; 428/403; 502/117, 302, 313, 324, 325, 329, 230, 111, 225, 226, 227, 228

[56] References Cited

U.S. PATENT DOCUMENTS

| | | | |
|---|---|---|---|
| 3,367,924 | 2/1968 | Rinehart | 526/134 X |
| 3,901,865 | 8/1975 | Tanaka et al. | 526/134 |
| 3,959,234 | 5/1976 | Kurosawa et al. | 260/78 UA |
| 4,176,220 | 11/1979 | Ikeda et al. | 526/97 |
| 4,490,512 | 12/1984 | Katz | 526/75 |
| 4,692,548 | 9/1987 | Drent | 502/155 X |
| 4,808,635 | 2/1989 | Nguyen | 521/150 |
| 4,883,851 | 11/1989 | Grubbs et al. | 526/268 |
| 5,082,909 | 1/1992 | Bell | 526/283 X |

FOREIGN PATENT DOCUMENTS 1594934 7/1970 France.

OTHER PUBLICATIONS

Handbook of Chem. and Physics, Hodgman (ed.), Chemical Rubber Publishing Co., Cleveland, Ohio, pp. 1660-1661 (1955).
K. J. Ivin, "Olefin Metathesis" Academic Press, 1983.
H. T. Ho, et al. "Metathesis Polymerization of Substituted Norbornenes..." Eur. Polym. J. vol. 25, No. 7/8 pp. 805-811, 1989.
K. J. Ivin, et al. "Role of Dioxygen as an Activatior in Olefin Metathesis", J.C.S. Chem. Comm., pp. 1062-1064, 1981.
"Olefin Metathesis and Ring-Opening Polymerization of Cyclo-Olefins", V. Dragutan et al, John Wiley & Sons Limited, pp. 172, 175, 177.

Primary Examiner—Fred Teskin
Attorney, Agent, or Firm—Thomas E. Kelley; Mark F. Wachter

[57] ABSTRACT

Cyclic olefin metathesis polymerization catalyst comprising metal compounds wherein said metals consist essentially of a minor amount of a transition metal which will initiate ring-opening metathesis polymerization of a cyclic olefin and a major amount of at least one second metal which will propagate the polymerization, wherein said catalyst is essentially devoid of pyrophoric metal compounds, e.g. metal alkyls, and preformed metal carbenes. A preferred transition metal is ruthenium. Said second metal can comprise aluminum, copper, hafnium, iron (III), iridium, manganese, molybdenum, nickel, niobium, rhenium, rhodium, tantalum, titanium, tungsten, yttrium, a Lanthanide, zinc or zirconium or a mixture thereof. Using such catalyst cyclic olefin, e.g. norbornene derivatives, can be polymerized, e.g. in an extruder, even in the presence of water.

29 Claims, No Drawings

METATHESIS POLYMERIZATION CATALYST AND METHOD OF POLYMERIZING CYCLIC OLEFINS THEREWITH

Disclosed herein are catalysts, which are especially useful for metathesis polymerization of cyclic olefins, mixtures thereof with cyclic olefin monomers, polymers derived from such mixtures and methods of polymerizing such mixtures.

BACKGROUND OF THE INVENTION

Metathesis ring-opening polymerization of cyclic olefin monomers such as norbornene and dicyclopentadiene is typically effected with transition metal catalysts in a mechanism in which olefinic, carbon-carbon double bonds of a monomer are split and transposed to link monomer units with olefinic, carbon-carbon double bonds. It is surmised that transition metal carbenes initiate and propagate such polymerization. See Chapter 2 of K. J. Ivin's *Olefin Metathesis*, Academic Press, London (1983), for a survey of olefin metathesis catalyst systems. Metathesis catalysts are classified by Ivin as (a) those consisting of an actual metal carbene, (b) those containing an alkyl or allyl group in one of the components from which a carbene ligand can readily be generated and (c) those having neither a preformed carbene nor an alkyl group in any component.

A commonly used catalyst system, e.g. disclosed in U.S. Pat. No. 3,959,234, comprises tungsten, e.g. as tungsten hexachloride, which does not by itself initiate polymerization but which will propagate such polymerization once initiated, and an initiator such as an aluminum, zinc or tin alkyl, e.g. diethylaluminum chloride. Such initiators extremely hazardous; for instance, diethylaluminum chloride is a pyrophoric liquid which ignites spontaneously in air, reacts violently with water and is hazardous to health. Further disadvantages are that such catalyst systems are often difficult to regulate, e.g. to produce thermoplastic polymers of a desirable molecular weight, and produce highly colored polymers, e.g. ranging from dark yellow to pitch black. The preparation of clear polymers is disclosed in U.S. Pat. No. 4,808,635 using a tantalum compound and aluminum alkyl as the metathesis polymerization catalyst system.

An alternative but more costly common catalyst system, disclosed in the 1970 publication of French Patent No. 1,594,934, comprises ruthenium compounds, e.g. ruthenium trichloride hydrate, which produces colored polymers, e.g. pale red to dark yellow. Another disadvantage, as shown in the Examples herein, is that such ruthenium catalysts tend to produce polymers of undesirably high molecular weight, e.g. about 1,000,000 Daltons, and at low yield.

SUMMARY OF THE INVENTION

This invention provides a novel catalyst system which is useful for olefin metathesis, i.e. ring-opening polymerization of cyclic olefins such as norbornene and derivatives thereof, e.g. norbornene nitrile and norbornene dicarboximides. Although carbenes are believed to be necessary for initiation of olefin metathesis, the catalyst systems of this invention do not contain preformed metal carbenes and do not contain alkyl or allyl groups, e.g. aluminum alkyls, from which carbene ligands are readily formed. The catalyst systems of this invention are advantageously low in cost, reliable, not dangerously pyrophoric, e.g. do not contain metal alkyls and can tolerate, water. Such catalyst systems comprise inorganic metal compounds and consist essentially of a minor amount of a transition metal inorganic compound which can initiate the metathesis ring-opening polymerization of a cyclic olefin, e.g. ruthenium, iridium or osmium, and a major amount of a special inorganic metal compound which propagates but does not initiate the ring-opening metathesis polymerization of a cyclic olefin, e.g. tungsten or manganese. The inorganic compounds comprising the catalysts of this invention can be oxides or salts which are soluble in common solvents useful for catalyst systems, e.g. toluene, ethanol, water, etc. Chlorides, including hydrates of chlorides, of metals are especially useful in many applications of catalysts of this invention.

Another aspect of this invention provides catalysts useful for metathesis ring-opening polymerization of norbornene derivatives using, as a propagating catalyst species one of a variety of inorganic compounds of metals which have heretofore not been recognized as catalytically effective in the ring-opening metathesis polymerization of norbornene derivatives. Such metals including manganese, nickel, iron (III), yttrium and any of the Lanthanides, zinc and copper (II) have been discovered to be surprisingly efficacious as a catalyst species for propagating the ring-opening metathesis polymerization of norbornene derivative monomers when used with a minor amount of a polymerization initiating metal such as ruthenium. Because of the health hazard associated with osmium, preferred embodiments of such metathesis polymerization catalysts consist essentially of a minor amount of ruthenium and a major amount of aluminum, copper, hafnium, iron (III), iridium, manganese, molybdenum, nickel, niobium, rhenium, rhodium, tantalum, titanium, tungsten, yttrium and the Lanthanides, zinc or zirconium or a mixture thereof. An especially preferred catalyst comprises ruthenium and manganese.

In another aspect of this invention provides metathesis polymerization catalyst comprising said metals in a ratio that provides thermoplastic polymers having a number average molecular weight between about 20,000 Daltons and 100,000 Daltons. As is illustrated in the following examples, the catalytic metals can be readily selected in appropriate amounts for desirable polymer molecular weight and conversion. Other factors influencing choice of catalyst metal include cost, tolerance for water and color from residual catalyst. For instance, a catalyst comprising about 10 to 30 parts of ruthenium and about 50 to 300 parts of tungsten, per weight of monomer, provides polymer of substantially lower color than is typically achieved in polymers prepared by using either one of such catalysts alone.

Another aspect of this invention comprises particles of metathesis polymerizable monomer coated with such catalyst. Such particles are advantageously stable even when exposed to humid environments and can be polymerized by mixing the molten monomer, e.g. in an extruder. Such monomer can advantageously comprise a cyclic olefin such as norbornene or derivative thereof. Preferred monomers for preparing high heat resistant thermoplastic polymers include norbornene dicarboximides, e.g. an N-alkyl, cycloalkyl or aryl norbornene dicarboximide.

Still another aspect of this invention comprises polymeric compounds of metathesis polymerizable monomer comprising residual catalyst of this invention, e.g.

consisting essentially of a minor amount of a ruthenium compound and a major amount of a metal which does not initiate ring-opening metathesis polymerization, e.g. manganese or tungsten. Preferred polymers are thermoplastic polymers having a glass transition temperature of at least 150° C. and a number average molecular weight between about 20,000 and 100,000 Daltons. Unlike most metathesis polymerized polymers, the polymers of this invention are advantageously clear.

Yet another aspect of this invention comprises methods of polymerizing metathesis polymerizable monomers comprising mixing molten monomer and a catalyst of this invention.

DETAILED DESCRIPTION OF THE INVENTION

Unless indicated otherwise concentrations reported herein are by weight. In particular, concentrations of catalyst metal are expressed in parts per million (ppm) by weight of the metal species based on the total weight of the composition. For instance, in the case of a monomer mixture to be polymerized, the catalyst is expressed as parts by weight of the metal species per million parts by weight of initial monomer. And, in the case of a polymer, residual catalyst is expressed as parts by weight of the residual metal species per million parts by weight of the polymer composition.

The catalyst of this invention comprises of a minor amount of a transition metal which will initiate ring-opening metathesis polymerization of a cyclic olefin such as norbornene or norbornene derivative monomer, e.g. norbornene nitrile or norbornene dicarboximide such as N-methyl norbornene dicarboximide, N-cyclohexyl norbornene dicarboximide, N-phenyl norbornene dicarboximide and the like. Such minor amount metals are known to include ruthenium and osmium which when used as a chloride salt are effective in initiating and propagating ring-opening metathesis polymerization. When used in the catalyst system of this invention, initiating catalyst metals such as ruthenium and osmium are employed at levels which, when used alone, generally result in undesirable polymerization products, e.g. polymers of undesirably high molecular weight of low conversion. Such initiating catalyst metals are advantageously used at levels of about 30 ppm or less in the monomer. In general lower levels are expected to be preferred to reduce cost and residual catalyst. In many cases of norbornene derivative monomers are effectively polymerized using catalyst of this invention comprising up to about 20 ppm ruthenium or less, say about 5 to 15 ppm. Such polymerization initiating catalyst species can be provided as a soluble salt, e.g. ruthenium trichloride or osmium trichloride.

The metathesis polymerization catalyst of this invention also comprises a major amount, as compared to the polymerization initiating species, of a metal which does not initiate ring-opening metathesis polymerization of cyclic olefins. Such metal will, however, in the presence of a polymerization initiating species such as ruthenium, efficaciously propagate ring-opening metathesis polymerization of cyclic olefins such as norbornene or norbornene derivative monomer. Among the metals which will propagate but not initiate ring-opening metathesis polymerization are aluminum, copper, hafnium, iron (III), iridium, manganese, molybdenum, nickel, niobium, rhenium, rhodium, tantalum, titanium, tungsten, yttrium, zinc and zirconium and mixtures thereof.

As the major amount metal species of the catalyst of this invention, manganese is especially preferred.

Alternatively, it has been discovered that two polymerization initiating species, e.g. ruthenium and osmium, are efficacious even at low levels in propagating the polymerization of cyclic olefins in the absence of a non-initiating metal species, such as tungsten or manganese.

Because they do not contain pyrophoric initiator such as a metal alkyl, e.g. diethylaluminum chloride, the catalyst systems of this invention are advantageously tolerant of water. For instance, as illustrated in the following examples, polymerization of has been effected in monomer containing 20 percent water.

The catalyst systems of this invention are useful in polymerizing a wide variety of olefinic monomers, especially cyclic olefins such as norbornene, dicyclopentadiene and derivatives thereof. In preparing such polymers it is generally desirable, e.g for the sake of economy and to minimize residual catalyst which may contaminate the polymer product, to employ the least amount of catalyst that can reliably effect polymerization. In the case of preparing thermoplastic polymers, e.g. of norbornene derivative monomers such as norbornene dicarboximides, it is useful to effect polymerization using a catalyst consisting essentially of an initiating species, e.g. ruthenium in an amount of about 5 to 50 ppm, preferably about 10 to 30 ppm, and a non-initiating species, e.g. manganese or tungsten in an amount of about 50 to 1000 ppm, preferably, depending on the metal species, about 100 to 500 ppm. Polymerization of thermoplastic polymers can be effected in a solution, e.g. in dichloroethane, or in liquid monomer. When the monomer is solid at room temperature, polymerization can be effected in a melt of the monomer provided that the melt temperature of the monomer is below the decomposition temperature of the polymer. Because polymerization does not proceed on solid monomer, the catalyst of this invention can be advantageously applied to particles of the monomer or the catalyst species can often be encapsulated in monomer. For instance, catalyst-coated monomer can be optionally stored for an extended period of time or immediately melted and mixed, e.g. in an extruder, to effect polymerization.

Preparation of crosslinked polymer, e.g. by polymerizing dicyclopentadiene, is advantageously effected using the catalyst of this invention. Liquid dicyclopentadiene is commonly employed in reaction injection molding of crosslinked plastic parts by mixing a stream of dicyclopentadiene containing a tungsten catalyst with a stream containing an aluminum alkyl; the mixed streams are rapidly injected into a heated mold.

Because of the above described hazards associated with initiator catalyst such as aluminum alkyl, such reaction injection molding can be more safely effected using the catalyst of this invention.

In the following examples, although catalyst systems of tungsten and ruthenium compounds are principally employed to illustrate embodiments of the preparation and use of various aspects of this invention, it should be clear from the variety of metal species illustrated that there is no intention of so limiting the scope of the invention. On the contrary, it is intended that the breadth of the invention illustrated by reference to tungsten and ruthenium catalyst systems applies to any other metals which will propagate and or initiate the ring-opening metathesis polymerization of cyclic olefins.

EXAMPLE 1

This example illustrates the preparation of catalyst solutions according to this invention comprising tungsten and ruthenium compounds and illustrates the basis for determining amounts of catalytic metal in a reaction mixture of norbornene derivative monomer. A "Tungsten Solution" was prepared by dissolving 0.026 parts of tungsten hexachloride in 6 parts of dry toluene; a "Ruthenium Solution" was prepared by dissolving 0.015 parts of ruthenium trichloride in 10 parts of ethanol. The addition of 0.125 g of "Tungsten Solution" and 0.0159 g of "Ruthenium Solution" to 1 g of norbornene derivative monomer provides a reaction mixture containing 250 ppm tungsten and 10 ppm ruthenium.

EXAMPLE 2

This example illustrates the preparation of stereoisomers of norbornene derivative monomers, i.e. N-methyl norbornene dicarboximides (N-MND). Norbornene dicarboximide monomers can exist as a exo or endo stereoisomer depending on whether the rigid imide group is trans or cis, respectively, to olefinic double bond at the opposite end of the monomer. Norbornene dicarboximide monomers can be prepared by reacting norbornene dicarboxylic acid anhydride, the Diels-Alder reaction product of cyclopentadiene and maleic anhydride, e.g. as disclosed in U.S. Pat. No. 4,022,954, with a primary amine, e.g. methyl amine, providing an amic acid which is readily imidized. Equilibrium mixtures of norbornene dicarboximides comprise about 45% endo stereoisomer and 55% exostereoisomer. Observation of experimental results indicates that the endo stereoisomer retards ring-opening polymerization of stereoisomeric mixtures of norbornene dicarboximide monomers. Thus, it is advantageous to recover such monomers with higher levels of the exo stereoisomer. Selective crystallization is a useful method of providing such monomers at high levels of the exo stereoisomer, e.g. up to about 95% most preferably 100%, to provide monomer which is amenable to high conversion to polymer in metathesis ring-opening polymerizations. In the subsequent examples employing N-MND reference is made to the exo stereoisomeric content of the monomer, e.g. 55%, 75%, 95% and 100% exo stereoisomeric with the balance being the endo stereoisomer.

Analysis of isomer form of monomer and polymerization efficiency was effected by nuclear magnetic resonance NMR). Both $C_{13}$ and $H_1$ spectra were obtained. An aliquot of nominal 5% polymer solution was flash dried at room temperature to a tacky solid which was vacuum dried at room temperature to provide solid polymer which Was dissolved by agitation in 3 g of deutero chloroform to provide a nominal 10% polymer solution for NMR analysis.

EXAMPLE 3

This example illustrates the advantageous polymerization of norbornene derivative monomer, i.e. 100% exo N-MND, using a catalyst mixture according to this invention, as compared to polymerization employing the separate transition metal components of the mixture. To glass vials containing 1 g of 100% exo N-MND was added (a) 0.092 g of Tungsten Solution, providing a monomer mixture comprising 184 ppm tungsten; (b) 0.02385 g of "Ruthenium solution, providing a monomer mixture comprising 15 ppm ruthenium; and (c) 0.099 g of Tungsten Solution and 0.027 g of Ruthenium Solution, providing a monomer mixture comprising 197 ppm tungsten and 17 ppm ruthenium. The vials were capped and immersed in a 150° C. oil bath; monomer melting was completed within 2-4 minutes. After 10 minutes the vials Were allowed to cool in room temperature air. The resulting material was analyzed by Size Exclusion Chromatography (SEC) for number average molecular weight ($M_n$) of polymer produced and percent conversion of monomer to polymer. Nominal 5% solids solutions were prepared by adding 19 g chloroform to the resulting material in each of the reaction vials; the vials were mechanically shaken to effect dissolution. After dissolution, nominal 0.25% solids solution were prepared by diluting 0.5 g of the nominal 5% solids solutions with 9.5 g chloroform. Conventional SEC analysis was performed on the nominal 0.25% solids solutions. The results of the SEC analysis is reported in Table 1.

TABLE 1

| Monomer W (ppm) | Ru (ppm) | $M_n$ (x1000) | Conversion (%) |
|---|---|---|---|
| 184 | 0 | 0 | 0 |
| 0 | 15 | 1470 | 21 |
| 197 | 17 | 112 | 84 |

The results reported in Table 1 illustrate that a transition metal such as tungsten, which is conventionally used in metathesis ring-opening polymerization reactions with an initiator catalyst such as diethyl aluminum alkyl, when used without such initiator, was ineffective as a metathesis ring-opening polymerization catalyst. The results reported in Table 1 also illustrate that a transition metal catalyst such as ruthenium, when used alone, produced polymer of undesirably high molecular weight (1,470,000 Daltons) at low conversion (21%).

The results reported in Table 1 also illustrate the unexpected improvement in catalysis of metathesis ring-opening polymerization of cyclic olefins to polymers of desirable molecular weight, e.g. for engineering thermoplastic polymer applications, at substantially high conversion (84%).

EXAMPLE 4

This example further illustrates the improved catalysis in metathesis ring-opening polymerization of cyclic olefin, e.g. 100% exo N-MND, which is achieved with mixtures of transition metal catalysts according to this invention. 100% exo N-MND monomer was subjected to polymerization treatment essentially according to the procedure of Example 3 using a mixture of transition metal catalysts of this invention as indicated in Table 2. The results reported in Table 2 indicate that 100% exo N-MND was polymerized at exceptionally high conversion to polymer of desirable molecular weight for engineering thermoplastic applications, e.g. about 65-240 k Daltons, using widely varying amounts of the transition metals, tungsten and ruthenium.

TABLE 2

| W (ppm) | Ru (ppm) | $M_n$ (x1000) | Conversion (%) |
|---|---|---|---|
| 0 | 39 | 120 | 76 |
| 0 | 49 | 88 | 83 |
| 0 | 63 | 68 | 87 |
| 49 | 41 | 104 | 91 |
| 55 | 31 | 126 | 88 |
| 75 | 14 | 238 | 65 |
| 92 | 20 | 65 | 87 |
| 165 | 7 | 186 | 68 |
| 156 | 14 | 218 | 68 |

TABLE 2-continued

| W (ppm) | Ru (ppm) | $M_n$ (x1000) | Conversion (%) |
|---|---|---|---|
| 169 | 21 | 235 | 83 |
| 197 | 17 | 112 | 84 |
| 221 | 33 | 125 | 94 |
| 213 | 42 | 162 | 95 |
| 355 | 23 | 103 | 94 |
| 302 | 28 | 122 | 95 |
| 349 | 49 | 184 | 95 |

EXAMPLE 5

This example serves to summarize the variability of metathesis ring-opening polymerization of a cyclic olefin, e.g. N-MND of varying stereoisomeric content, using a prior art catalyst consisting solely of ruthenium chloride essentially according to the procedure of Example 3.

TABLE 3

| Ru (ppm) | Monomer (% exo) | $M_n$ (x1000) | Conversion (%) |
|---|---|---|---|
| 15 | 100 | 1471 | 21 |
| 21 | 95 | 0 | 0 |
| 26 | 95 | 99 | 50 |
| 34 | 95 | 155 | 28 |
| 21 | 75 | 0 | 0 |
| 37 | 75 | 0 | 0 |
| 30 | 55 | 0 | 0 |
| 37 | 55 | 0 | 0 |

The results reported in Table 3 illustrate that a catalyst such as ruthenium, Which can initiate and propagate metathesis ring-opening polymerization of cyclic olefins, can provide polymer of undesirably high molecular weight (about 1500 k Daltons) at low conversion (21%) from high purity exo monomer even when used at low levels (15 ppm); but the utility of ruthenium as a catalyst degrades when the endo stereoisomer is present. For instance, When the monomer contains as little as 5% of the endo stereoisomer, polymer catalysis by ruthenium is erratic; and at higher levels of the endo isomer, e.g. 25% and 45%, essentially no polymer when is produced, even when ruthenium is used at moderate levels (up to 37 ppm).

EXAMPLE 6

This example further illustrates the improved catalysis in metathesis ring-opening polymerization of cyclic olefin monomer comprising 95% exo N-MND and 5% endo N-MND, a polymerization retardant, which is achieved with mixtures of transition metal catalysts according to this invention. 95% exo N-MND monomer was subjected to polymerization treatment essentially according to the procedure of Example 3 using a mixture of transition metal catalysts of this invention as indicated in Table 4. The results reported in Table 4 indicate that 95% exo N-MND was polymerized at exceptionally high conversion to polymer of desirable molecular weight for engineering thermoplastic applications, e.g. about 35–60 k Daltons, using widely varying amounts of the transition metals, tungsten and ruthenium.

TABLE 4

| W (ppm) | Ru (ppm) | $M_n$ (x1000) | Conversion (%) |
|---|---|---|---|
| 0 | 21 | 0 | 0 |
| 0 | 26 | 99 | 50 |
| 0 | 34 | 155 | 28 |
| 64 | 21 | 61 | 37 |

TABLE 4-continued

| W (ppm) | Ru (ppm) | $M_n$ (x1000) | Conversion (%) |
|---|---|---|---|
| 192 | 13 | 43 | 61 |
| 190 | 29 | 44 | 78 |
| 308 | 20 | 35 | 74 |

EXAMPLE 7

This example further illustrates the improved catalysis in metathesis ring-opening polymerization of cyclic olefin monomer comprising 75% exo N-MND and 25% endo N-MND, a polymerization retardant, which is achieved with mixtures of transition metal catalysts according to this invention. 75% exo N-MND monomer was subjected to polymerization treatment essentially according to the procedure of Example 3 using a mixture of transition metal catalysts of this invention as indicated in Table 5. The results reported in Table 5 indicate that 75% exo N-MND can be polymerized at to polymer useful for engineering thermoplastic applications, e.g. having a molecular weight of about 50–200 k Daltons, by selecting appropriate amounts of the transition metals, tungsten and ruthenium.

TABLE 5

| W (ppm) | Ru (ppm) | $M_n$ (x1000) | Conversion (%) |
|---|---|---|---|
| 0 | 21 | 0 | 0 |
| 0 | 37 | 0 | 0 |
| 58 | 12 | 0 | 0 |
| 57 | 30 | 625 | 25 |
| 187 | 23 | 74 | 42 |
| 319 | 12 | 179 | 10 |
| 318 | 28 | 47 | 28 |

EXAMPLE 8

This example illustrates the improved catalysis in metathesis ring-opening polymerization of cyclic olefin monomer comprising 55% exo N-MND and 45% endo N-MND, a polymerization retardant, which is achieved with mixtures of transition metal catalysts according to this invention. 55% exo N-MND monomer was subjected to polymerization treatment essentially according to the procedure of Example 3 using a mixture of transition metal catalysts of this invention as indicated in Table 6. The results reported in Table 6 indicate that 55% exo N-MND can be polymerized at to polymer useful for engineering thermoplastic applications, e.g. having a molecular weight of about 100–300 k Daltons, by selecting appropriate amounts of the transition metals, tungsten and ruthenium.

TABLE 6

| W (ppm) | Ru (ppm) | $M_n$ (x1000) | Conversion (%) |
|---|---|---|---|
| 0 | 37 | 0 | 0 |
| 59 | 20 | 0 | 0 |
| 188 | 12 | 100 | 5 |
| 195 | 34 | 207 | 28 |
| 320 | 19 | 316 | 17 |

EXAMPLE 9

This example illustrates the extreme tolerance of catalysts of this invention to water. A mixture of 100% exo N-MND monomer and substantial amounts of water, e.g. 11–23%, was subjected to polymerization treatment essentially according to the procedure of Example 3 using a mixture of transition metal catalysts of this invention as indicated in Table 7. The results reported in Table 7 indicate that mixtures of 100% exo N-MND and water can be polymerized at to polymer useful for engineering thermoplastic applications by selecting appropriate amounts of the transition metals, tungsten and ruthenium.

TABLE 7

| W (ppm) | Ru (ppm) | Water (%) | $M_n$ (x1000) | Conversion (%) |
|---|---|---|---|---|
| 48 | 23 | 23 | 0 | 0 |
| 57 | 17 | 11 | 536 | 15 |
| 177 | 25 | 12 | 123 | 85 |
| 351 | 30 | 21 | 278 | 54 |

EXAMPLE 10

This example illustrates an aspect of this invention comprising melt polymerizable cyclic olefin powder coated with humidity resistant catalyst. Catalytic metal coated monomer powder was prepared by coating 1 part N-MND monomer powder with a solution mixture of tungsten hexachloride (330 ppm) in toluene and ruthenium trichloride (23 ppm) in ethanol; the solvents were removed by flash drying. The catalytic metal coated powder was exposed to air (70% relative humidity, 25° C.) for 3 hours, then melt polymerized at 150° C. for 10 minutes, resulting in a polymer having a number average molecular weight of 64,000 Daltons at 67% conversion.

EXAMPLE 11

This example serves to illustrate the advantageous polymerization of cyclic olefin monomer (exo N-MND) using a minor amount of transition metal polymerization initiating species, e.g. ruthenium, and a wide variety of metals to efficaciously propagate polymerization. Polymerization propagating catalysts solutions were prepared in the manner of Example 1 from aluminum trichloride, cupric chloride, ferric chloride, iridium trichloride monohydrate, manganese dichloride dihydrate, molybdenum pentachloride, nickel dichloride hexahydrate, niobium pentachloride, rhenium trichloride, rhodium trichloride monohydrate, tantalum pentachloride, titanium tetrachloride, yttrium trichloride, zinc dichloride and zirconium tetrachloride, Catalyst solutions were combined in the proportions indicated in Table 8 with exo N-MND monomer and the catalyst monomer mixtures were subjected to polymerization conditions in the manner in EXAMPLE 3. The results reported in Table 8 show that, when mixed with a low levels of ruthenium to initiate polymerization, the various metals are surprisingly effective in catalyzing the ring-opening metathesis polymerization of cyclic olefins.

TABLE 8

| Propagating Metal Species | (ppm) | Ru (ppm) | Mn (X1000) | Conversion (%) |
|---|---|---|---|---|
| Al | 116 | 0 | 0 | 0 |
| Al | 113 | 14 | 24 | 64 |
| Cu | 120 | 0 | 0 | 0 |
| Cu | 111 | 13 | 8 | 62 |
| Fe | 122 | 0 | 0 | 0 |
| Fe | 100 | 14 | 10 | 49 |
| Fe | 106 | 20 | 8 | 70 |
| Ir | 204 | 0 | 0 | 0 |
| Ir | 195 | 15 | 38 | 54 |
| Mn | 187 | 0 | 0 | 0 |
| Mn | 182 | 13 | 33 | 75 |
| Mn | 202 | 22 | 33 | 75 |
| Mo | 390 | 0 | 0 | 0 |
| Mo | 292 | 15 | 12 | 73 |
| Mo | 492 | 17 | 20 | 76 |
| Nb | 134 | 0 | 0 | 0 |
| Nb | 121 | 16 | 28 | 74 |
| Nb | 91 | 18 | 43 | 77 |
| Ni | 244 | 0 | 0 | 0 |
| Ni | 235 | 16 | 31 | 72 |
| Re | 130 | 0 | 0 | 0 |
| Re | 103 | 13 | 23 | 70 |
| Rh | 83 | 0 | 0 | 0 |
| Rh | 84 | 14 | 19 | 52 |
| Ta | 262 | 0 | 0 | 0 |
| Ta | 277 | 16 | 26 | 75 |
| Ta | 219 | 17 | 30 | 80 |
| Ti | 1096 | 0 | 0 | 0 |
| Ti | 962 | 15 | 11 | 80 |
| Ti | 592 | 18 | 15 | 80 |
| Yt | 226 | 0 | 0 | 0 |
| Yt | 217 | 15 | 19 | 72 |
| Yt | 207 | 19 | 22 | 58 |
| Zn | 331 | 0 | 0 | 0 |
| Zn | 304 | 16 | 58 | 45 |
| Zr | 337 | 0 | 0 | 0 |
| Zr | 338 | 13 | 32 | 66 |
| Zr | 315 | 20 | 23 | 66 |

EXAMPLE 12

This example serves to illustrate the utility of using osmium to initiate the ring-opening metathesis polymerization of cyclic olefin monomer (exo N-MND) along with a variety of other metals, e.g. manganese and tantalum, to propagate such polymerization. Catalyst solutions were prepared in the manner in Example 1 from osmium trichloride monohydrate, manganese dichloride tetrahydrate and tantalum pentachloride. Catalyst solutions were combined in the proportions indicated in Table 9 with exo N-MND monomer and the catalyst monomer mixtures were subjected to polymerization conditions in the manner of Example 3. The results reported in Table 9 show that, when mixed with a low levels of osmium to initiate polymerization, various metals are surprisingly effective in catalyzing the ring-opening metathesis polymerization of cyclic olefins.

TABLE 9

| Propagating Metal Species | (ppm) | Os (ppm) | Mn (X1000) | conversion (%) |
|---|---|---|---|---|
| — | — | 29 | 0 | 0 |
| — | — | 45 | 274 | 7 |
| Mn | 187 | 0 | 0 | 0 |
| Mn | 201 | 49 | 18 | 60 |
| Ta | 262 | 0 | 0 | 0 |
| Ta | 336 | 47 | 12 | 66 |

EXAMPLE 13

This example serves to illustrate the surprisingly effective ring-opening metathesis polymerization of cyclic olefin (exo N-MND) using low levels of a combination of polymerization initiating metal species, i.e. ruthenium and osmium. In the manner of Examples 1-3, ruthenium and osmium catalyst solutions were combined in the proportions indicated in Table 10 with exo N-MND monomer and the catalyst monomer mixtures were subjected to polymerization conditions. The results reported in Table 10 show that low levels of ruthenium and osmium are surprisingly effective to initiate and propagate the ring-opening metathesis polymerization of cyclic olefins.

TABLE 10

| Ru (ppm) | Os (ppm) | Mn (X1000) | Conversion (%) |
|---|---|---|---|
| 0 | 29 | 0 | 0 |
| 0 | 18 | 0 | 0 |
| 15 | 0 | 1470 | 21 |
| 10 | 17 | 111 | 33 |

EXAMPLE 14

This example illustrates the advantageous polymerization achieved by mixing cyclic olefins and a catalyst system of this invention.

2 grams of exo-NMD was polymerized essentially in the manner of Example 3 using ruthenium and manganese as the catalytic metals in the amounts indicated in Table 11, except that after about 3 minutes of static polymerization at 150° C., the vial was placed in a 185° C. bath for about 2 minutes while the contents were stirred with a glass rod; after mixing the vial was removed to a 150° C. bath for about 10 minutes of further static reaction. The control with no mixing is taken from Example 11.

TABLE 11

| Ru (ppm) | Mn (ppm) | Mn (X1000) | Conversion (%) |
|---|---|---|---|
| 24 | 189 | 29 | 92 |
| 18 | 210 | 34 | 91 |
| -- control: no mixing -- from Ex. 11 -- | | | |
| 22 | 202 | 33 | 75 |

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

I claim:

1. A catalyst comprising metal compounds coated on particles of a ring-opening, metathesis-polymerizable cyclic olefin monomer, wherein the metals of said metal compounds consist essentially of a minor amount of a transition metal which will initiate metathesis ring-opening polymerization of a cyclic olefin and a major amount of at least one second metal which will propagate the polymerization, wherein said catalyst is essentially devoid of pyrophoric metal compounds.

2. A catalyst according to claim 1 wherein said transition metal is ruthenium and said second metal is aluminum, copper, hafnium, iron (III), iridium, manganese, molybdenum, nickel, niobium, rhenium, rhodium, tantalum, titanium, tungsten, yttrium, a Lanthanide, zinc, zirconium or a mixture thereof and wherein the compound of said second metal is not a metal alkyl compound.

3. A catalyst according to claim 2 wherein said second metals is manganese.

4. A catalyst according to claim 1 wherein said monomer comprises norbornene or a derivative thereof.

5. A catalyst according to claim 4 wherein said monomer is a norbornene dicarboximide.

6. A catalyst according to claim 5 wherein said monomer is an N-alkyl, N-cycloalkyl or N-aryl norbornene dicarboximide.

7. A catalyst according to claim 1 comprising said metals in a ratio that provides polymers of cyclic olefin monomers having a number average molecular weight between about 20,000 and 100,000 Daltons.

8. A catalyst according to claim 1 comprising about 10 to 30 ppm of ruthenium and about 50 to 1000 ppm of said second metal.

9. A catalyst according to claim 1 further comprising water.

10. A polymerizable mixture of metal compounds and ring-opening, metathesis-polymerizable cyclic olefin monomer, wherein said compounds consist essentially of a minor amount of a ruthenium compound and a major amount of at least one compound of a second metal which will propagate the polymerization, wherein said second metal is selected from the group consisting of aluminum, copper, hafnium, iron (III), iridium, manganese, molybdenum, nickel, niobium, rhenium, rhodium, tantalum, titanium, tungsten, yttrium, a Lanthanide, zinc, zirconium or a mixture thereof and wherein said catalyst is essentially devoid of pyrophoric metal compounds.

11. A catalyst according to claim 10 wherein said second metal is manganese.

12. A catalyst according to claim 10 further comprising water.

13. A catalyst according to claim 10 comprising said metals in a ratio that provides polymers of cyclic olefin monomers having a number average molecular weight between about 20,000 and 100,000 Daltons.

14. A catalyst according to claim 10 comprising about 10 to 30 ppm of ruthenium and about 50 to 1,000 ppm of said second metal.

15. A catalyst according to claim 10 further comprising water.

16. A catalyst according to claim 10 wherein said monomer comprises norbornene or a derivative thereof.

17. A catalyst according to claim 16 wherein said monomer is a norbornene dicarboximide.

18. A catalyst according to claim 17 wherein said monomer is an N-alkyl, N-cycloalkyl or N-aryl norbornene dicarboximide.

19. A method for polymerizing cyclic olefin monomer comprising melting the monomer component of the catalyst of claim 28 to provide a mixture of metal compounds and molten monomer and mixing the mixture for sufficient time to polymerize said monomer.

20. A method according to claim 19 wherein said metals consist essentially of manganese and ruthenium.

21. A method according to claim 19 wherein mixing is effected in the presence of water.

22. A method according to claim 19 wherein said mixing is effected in an extruder.

23. A method of polymerizing cyclic olefin monomer comprising mixing the mixture of claim 10 for sufficient time to polymerize said monomer, wherein polymerization is effected in solution or in liquid monomer.

24. A method according to claim 19 wherein said mixture comprises norbornene or norbornene derivative.

25. A method according to claim 24 wherein said mixture comprises up to 50 ppm of ruthenium and a greater amount of said second metal.

26. A method according to claim 25 wherein said second metal is tungsten or manganese.

27. A method according to claim 25 wherein said mixture comprises less than 30 ppm ruthenium.

28. A catalyst for the ring-opening, metathesis polymerization of cyclic olefins consisting essentially of a minor amount of a ruthenium compound and a major amount of a manganese compound which is not a metal alkyl compound.

29. A catalyst for the ring-opening, metathesis polymerization of cyclic olefins comprising: water, a minor amount of a ruthenium compound, and a major amount of a second metal compound, wherein the second metal is selected form the group consisting of aluminum, copper, hafnium, iron (III), iridium, manganese, molybdenum, nickel, niobium, rhenium, rhodium, tantalum, titanium, tungsten, yttrium, a Lanthanide, zinc, zirconium or a mixture thereof, wherein said second metal compound is not a metal alkyl compound.

* * * * *